US012401173B2

(12) United States Patent
Blankmeister et al.

(10) Patent No.: US 12,401,173 B2
(45) Date of Patent: Aug. 26, 2025

(54) PRE-CHAMBER SPARK PLUG HAVING IMPROVED HEATING MANAGEMENT

(71) Applicant: Robert Bosch GmbH, Stuttgart (DE)

(72) Inventors: Matthias Blankmeister, Heiligenhaus (DE); Stephan Kaske, Sternenfels Diefenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 18/559,914

(22) PCT Filed: Apr. 26, 2022

(86) PCT No.: PCT/EP2022/060997

§ 371 (c)(1),
(2) Date: Nov. 9, 2023

(87) PCT Pub. No.: WO2022/238105

PCT Pub. Date: Nov. 17, 2022

(65) Prior Publication Data

US 2025/0087973 A1 Mar. 13, 2025

(30) Foreign Application Priority Data

May 11, 2021 (DE) ..................... 10 2021 204 751.3

(51) Int. Cl.
*H01T 13/54* (2006.01)
*H01T 13/16* (2006.01)
*H01T 13/20* (2006.01)

(52) U.S. Cl.
CPC ............. *H01T 13/54* (2013.01); *H01T 13/16* (2013.01); *H01T 13/20* (2013.01)

(58) Field of Classification Search
CPC .......... H01T 13/54; H01T 13/16; H01T 13/20
USPC .......................................................... 313/130
See application file for complete search history.

(56) References Cited

U.S. PATENT DOCUMENTS

2013/0055986 A1 3/2013 Tozzi et al.
2016/0053670 A1 2/2016 Tozzi et al.
2022/0140576 A1* 5/2022 Niessner ................ H01T 13/08 315/246

FOREIGN PATENT DOCUMENTS

DE 102012102731 A1 7/2013
DE 102017204241 A1 9/2018
DE 102017107728 A1 10/2018
DE 102018214232 A1 2/2020

(Continued)

OTHER PUBLICATIONS

International Search Report for PCT/EP20202/060997, issued Aug. 23, 2022.

*Primary Examiner* — Christopher M Raabe
(74) *Attorney, Agent, or Firm* — NORTON ROSE FULBRIGHT US LLP

(57) ABSTRACT

A pre-chamber spark plug. The pre-chamber spark plug includes a central electrode and at least one ground electrode, a housing, an insulator that electrically insulates the central electrode from the housing, a cap having at least one cap hole, and a pre-chamber having a defined gas volume. The insulator includes a base portion which protrudes into the pre-chamber in the axial direction over a base length and which is in contact with the gas volume, and wherein a ratio of the gas volume to the base length is in a range of: R=40 to 300 $mm^2$.

10 Claims, 1 Drawing Sheet

(56) References Cited

FOREIGN PATENT DOCUMENTS

| | | | |
|---|---|---|---|
| DE | 102019205478 | A1 | 10/2020 |
| JP | 2020187839 | A | 11/2020 |

* cited by examiner

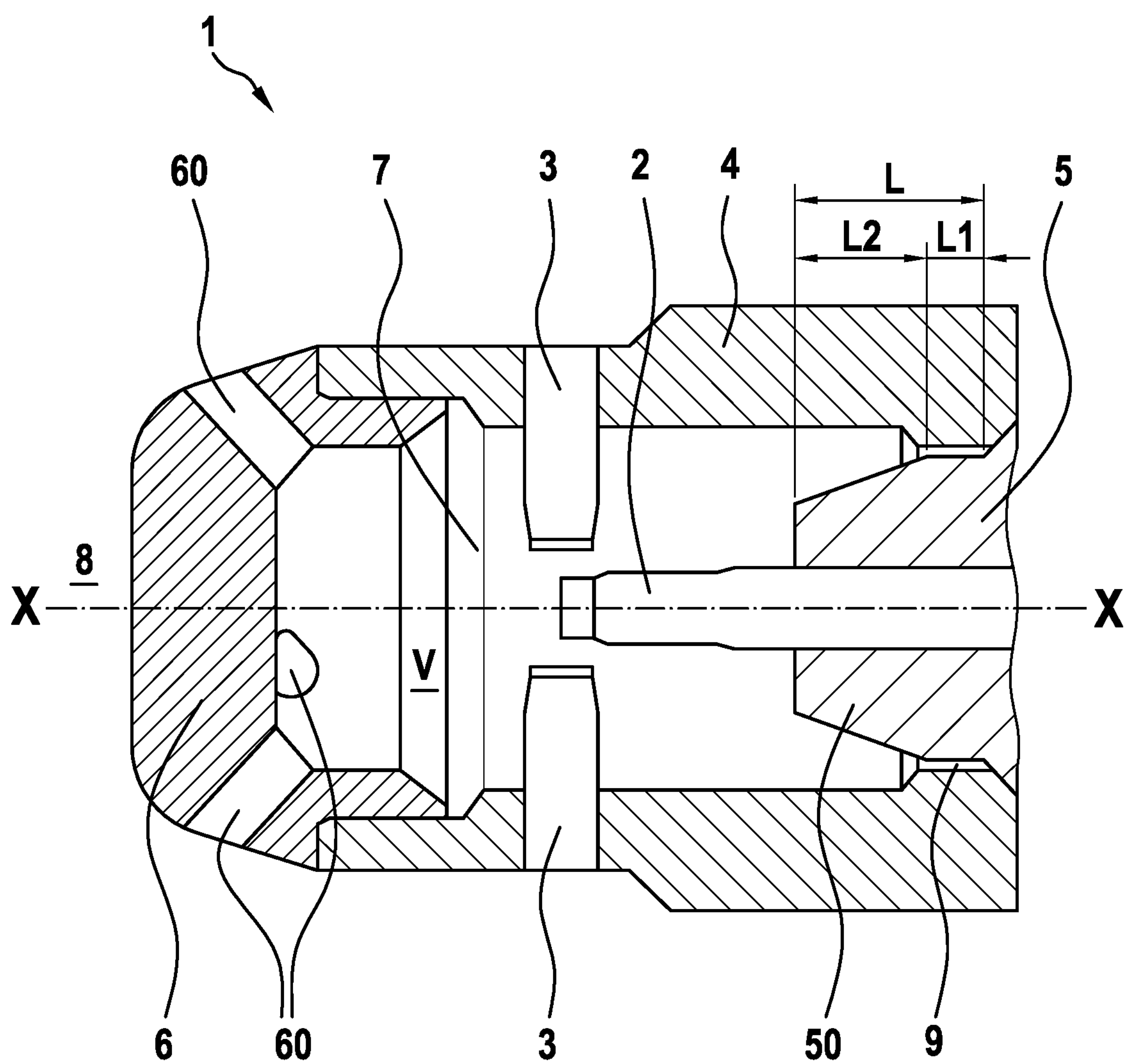
1
60
7
3
2
4
L
L2
L1
5
8
X
X
V
6
60
3
50
9

PRE-CHAMBER SPARK PLUG HAVING IMPROVED HEATING MANAGEMENT

FIELD

The present invention relates to a pre-chamber spark plug having heat optimization in the region of the pre-chamber, in particular for mobile internal combustion engines.

Pre-chamber spark plugs are described in the related art in different designs. In the related art, pre-chamber spark plugs have hitherto been used mainly in stationary gas engines, which usually run at only a single operating point with a relatively high load. The relevant pre-chamber spark plugs are then designed for this operating point. However, such pre-chamber spark plugs for stationary gas engines cannot be used directly for mobile internal combustion engines, for example in motor vehicles, since in mobile applications the internal combustion engines are operated in different load ranges, in particular also in partial load ranges. Mobile operation with different load ranges can lead to an undesired build-up of heat at the cap or in the wall regions of the pre-chamber of the pre-chamber spark plug, which can lead to undesired auto-ignition. However, such undesired auto-ignition can cause damage to the internal combustion engine and have a negative effect on fuel consumption and the emission behavior of the internal combustion engine.

SUMMARY

A pre-chamber spark plug according to the present invention may have an advantage that undesired auto-ignition can be avoided during operation of the pre-chamber spark plug. In this way, a risk of damage to the internal combustion engine due to such undesired auto-ignition is avoided. Furthermore, the ignition timing can be selected individually in particular for mobile internal combustion engines, and can also be changed during operation without heat problems occurring at the spark plug as a result. An undesired heat build-up at the cap or in the region of the pre-chamber of the pre-chamber spark plug can thus be avoided, so that the pre-chamber spark plug is designed in particular for operation in mobile internal combustion engines. In this case the pre-chamber spark plug can nevertheless be constructed in a simple manner and in particular can be suitable for mass production, so that the production costs can be significantly reduced. According to an example embodiment of the present invention, this may be achieved in that the pre-chamber spark plug has a central electrode and at least one ground electrode. Furthermore, the pre-chamber spark plug comprises a housing, an insulator which electrically insulates the central electrode from the housing, and a cap with at least one cap hole. A pre-chamber of the pre-chamber spark plug is here situated in the interior of the cap and in a portion of the housing. The pre-chamber has a gas volume V which is filled with gas. Furthermore, the insulator has a base portion which protrudes into the pre-chamber and has a base length L in the axial direction X-X, at which the outer wall region of the insulator forms a wall region of the pre-chamber. The base portion of the insulator is therefore in contact with the gas volume V. The ratio R of the gas volume V to the axial base length L of the base portion is in a range of R=V:L=40 to 300 $mm^2$. If the ratio R is in this range, it can be ensured that no heat build-up occurs during operation of the pre-chamber spark plug, even if the internal combustion engine is not operated in a constant load range, but in different load ranges and in particular also in partial load ranges.

The gas volume V of the pre-chamber is defined here as the volume that is filled with gas. The gas volume is also influenced in particular by the number and size of the ground electrodes and the geometric design of the central electrode and the ground electrode. A volume of the cap holes does not count towards the gas volume V of the pre-chamber.

Safe and improved combustion by the pre-chamber spark plug can thus be achieved, since incorrect ignitions caused by undesired auto-ignition due to a heat build-up in the region of the cap or the pre-chamber can be avoided. An efficiency of the internal combustion engine and the exhaust gas emissions of the internal combustion engine can thus be significantly improved.

Preferred developments of the present invention are disclosed herein.

Preferably, the ratio R of the gas volume V to the base length L of the base portion is in a range of R=80 to 200 $mm^2$ and more preferably in a range of R=85 to 135 $mm^2$.

According to a further preferred embodiment of the present invention, for a base length L of the base portion in a range of 3 to 4 mm and a gas volume V between 350 and 400 $mm^3$, R is in a range of 87.5 to 133.3. The range R is particularly preferably in a range of 100 $mm^{2+10}$ $mm^2$.

Further preferably, the base length L of the base portion of the insulator is formed by the sum of a gap length L1 and a pre-chamber length L2. The gap length L1 is provided in a region between the insulator and the housing in which a small radial gap is formed. The pre-chamber length L2 is the remaining length of the base portion that protrudes into the pre-chamber and has a greater radial distance than in the region of the gap between the insulator and the housing.

Particularly preferably, the pre-chamber length L2 is greater than the gap length L1. The gap length L1 is preferably approximately ⅓ of the base length L.

Furthermore, the present invention relates to a mobile internal combustion engine having a pre-chamber spark plug according to the present invention. The mobile internal combustion engine is preferably operated with gasoline or a gaseous fuel, such as natural gas or hydrogen. By using the pre-chamber spark plug according to the present invention, an efficiency and also an emission behavior of the internal combustion engine can be significantly improved in different load states, in particular in different partial load states.

BRIEF DESCRIPTION OF THE DRAWINGS

A preferred exemplary embodiment of the present invention is described in detail below with reference to the FIGURES.

FIG. 1 is a schematic partial sectional view of a pre-chamber spark plug according to a first preferred exemplary embodiment of the present invention.

DETAILED DESCRIPTION OF EXAMPLE EMBODIMENTS

In the following, a pre-chamber spark plug 1 according to a first preferred exemplary embodiment of the present invention is described in detail, with reference to FIG. 1.

As can be seen from FIG. 1, the pre-chamber spark plug 1 comprises a housing 4 and a cap 6, which define a pre-chamber 7.

The cap 6 is connected to the housing 4 for example by means of a welded connection.

The pre-chamber spark plug 1 further comprises a central electrode 2 and a plurality of ground electrodes 3. The ground electrodes 3 are fixed in openings 40 in the housing 4. The number of ground electrodes is preferably between 1 and 4.

A plurality of cap holes 60, which enable gas exchange between the pre-chamber 7 and a combustion chamber 8 of an internal combustion engine, are also provided in the cap 6. The internal combustion engine is preferably a mobile internal combustion engine which is operated in different load states, i.e. at full load and in various partial load states.

As can be seen further from FIG. 1, the pre-chamber 7 has a gas volume V. The gas volume V is the volume of the pre-chamber 7 which is filled with gas. This gas volume V of the pre-chamber 7 is filled with a fuel-air mixture through the cap holes 60 and can therefore absorb more or less energy depending on the size of the gas volume V. A volume of the cap holes 60 does not count towards the gas volume V.

The insulator 5, which electrically insulates the central electrode 2 from the housing 4, has a base portion 50 which protrudes into the pre-chamber 7 in the axial direction X-X of the pre-chamber spark plug 1. The base portion 50 of the insulator 5 is in this case the region of which the outer wall is in contact with the gas located in the pre-chamber 7.

As can be seen from FIG. 1, the base portion 50 has a base length L in the axial direction X-X of the pre-chamber spark plug, at which the base portion 50 is in contact with the gas volume V of the pre-chamber.

As can further be seen from FIG. 1, a gap 9 is provided here between the insulator 5 and the housing 4, and is designed as an annular gap. The gap 9 has a gap length L1 in the axial direction X-X. The remaining base length L is formed by a pre-chamber length L2 of the base portion 50 of the insulator 5. The gap length L1 is preferably approximately ⅓ of the base length L.

Surprisingly, it has now been found that a ratio R of the gas volume V to the base length L (R=V:L) is an extremely important indicator of a heat balance of the pre-chamber 7. It is particularly significant here that the insulator 5, which protrudes with its base portion 50 into the pre-chamber 7, has a different thermal conductivity, due to its thermal properties, than the housing 4, which is usually made of metal. As a result, the base length L significantly influences the heat balance of the pre-chamber 7. In particular, heat can be dissipated out of the pre-chamber 7 in the axial direction X-X by means of the insulator 5 in a targeted manner.

If the ratio R is here in a range of 40 to 300 $mm^2$, a temporary heat build-up within the pre-chamber 7 can reliably be prevented from occurring. As a result, so-called hotspots in the region of the pre-chamber 7 can be avoided, and undesired auto-ignition can thus be prevented. The internal combustion engine can be protected from damage in this way.

It is particularly advantageous if R=V/L=85 to 135 $mm^2$.

In particular, if the internal combustion engine is designed as a mobile internal combustion engine, it can be operated in different load states without thereby significantly negatively influencing the heat balance of the pre-chamber spark plug in the region of the cap 6 and the pre-chamber 7.

Surprisingly, the heat balance of the pre-chamber 7 can thus be influenced in a positive manner by the ratio R between the gas volume V and the base length L.

For mobile internal combustion engines, particularly preferably, a base length L of the base portion 50 is selected in a range of 3 to 4 mm in length, and a gas volume V of the pre-chamber 7 is selected in a range of 350 to 400 $mm^3$.

A mobile internal combustion engine can thus operate reliably in its entire engine map, so that the pre-chamber spark plug according to the present invention is particularly suitable for automotive applications. In particular, safe ignition can be achieved in every load range of the mobile internal combustion engine by means of the surprising provision according to the present invention.

The invention claimed is:

1. A pre-chamber spark plug, comprising:
a central electrode and at least one ground electrode;
a housing;
an insulator which electrically insulates the central electrode from the housing;
a cap with at least one cap hole; and
a pre-chamber having a defined gas volume;
wherein the insulator has a base portion which protrudes into the pre-chamber over a base length in a axial direction and is in contact with the gas volume; and
wherein a ratio R of the gas volume to the base length is in a range of: R=40 to 300 $mm^2$.

2. The pre-chamber spark plug according to claim 1, wherein the ratio R is in a range of 80 to 200 $mm^2$.

3. The pre-chamber spark plug according to claim 1, wherein the ratio R is in a range of 85 to 135 $mm^2$.

4. The pre-chamber spark plug according to claim 1, wherein, at a length of the base length in a range of 3 to 4 mm and a gas volume in a range between 350 and 400 $mm^3$, the ratio R is in a range of 87.5 to 133.3 $mm^2$.

5. The pre-chamber spark plug according to claim 4, wherein the ratio R is in a range of 100 $mm^2$±10 $mm^2$.

6. The pre-chamber spark plug according to claim 1, wherein the base length of the base portion of the insulator is composed of a sum of a gap length of a gap and a pre-chamber length of the base portion, wherein the gap is formed between the insulator and the housing.

7. The pre-chamber spark plug according to claim 6, wherein the pre-chamber length is greater than the gap length.

8. The pre-chamber spark plug according to claim 6, wherein the gap length is approximately ⅓ of the base length.

9. An internal combustion engine, comprising:
a pre-chamber spark plug including:
a central electrode and at least one ground electrode;
a housing;
an insulator which electrically insulates the central electrode from the housing;
a cap with at least one cap hole; and
a pre-chamber having a defined gas volume;
wherein the insulator has a base portion which protrudes into the pre-chamber over a base length in a axial direction and is in contact with the gas volume; and
wherein a ratio R of the gas volume to the base length is in a range of: R=40 to 300 $mm^2$.

10. The internal combustion engine according to claim 9, wherein the internal combustion engine is a mobile internal combustion engine.

* * * * *